July 14, 1925.
E. R. BURTNETT
1,546,007
INTERNAL COMBUSTION ENGINE
Filed Nov. 20, 1922   3 Sheets-Sheet 3
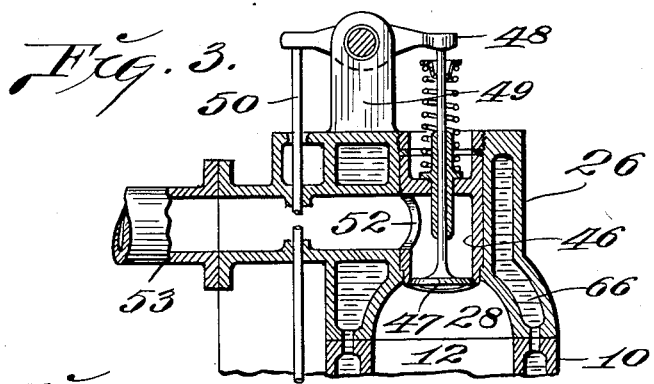
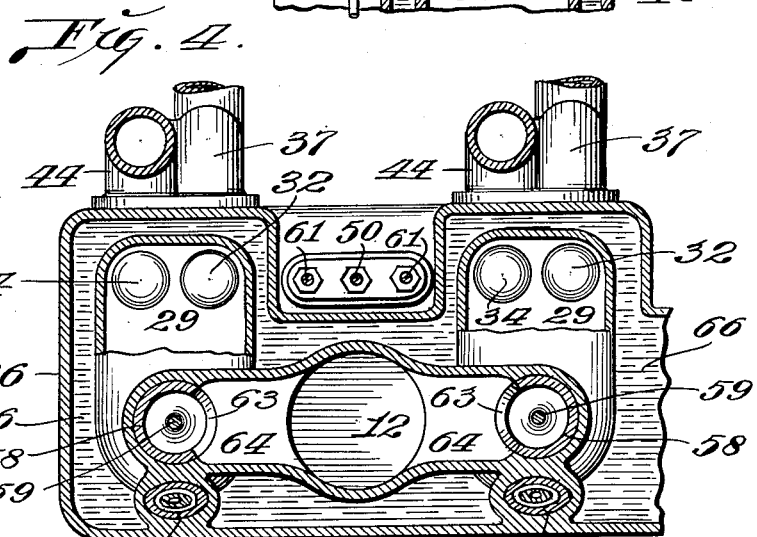
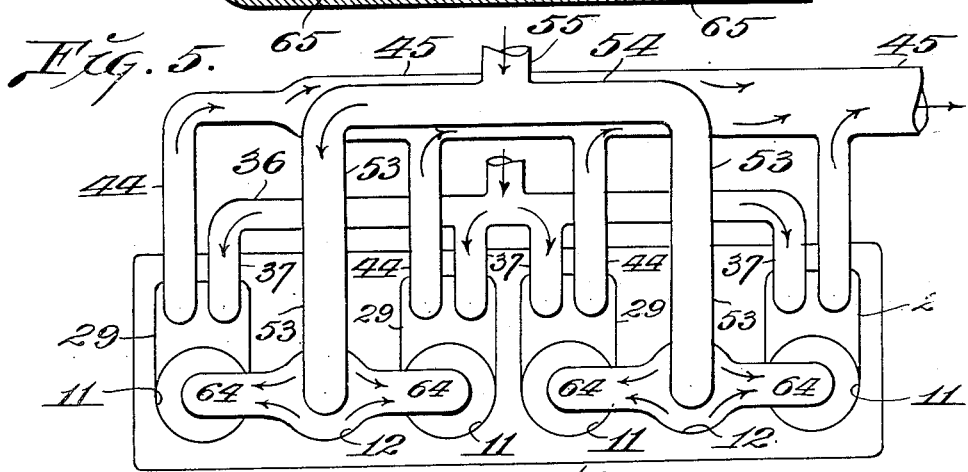
Inventor,
Everett R. Burtnett.
By Martin P. Smith, Atty.

Patented July 14, 1925.

1,546,007

UNITED STATES PATENT OFFICE.

EVERETT R. BURTNETT, OF LOS ANGELES, CALIFORNIA, ASSIGNOR OF ONE-HALF TO HOMER A. BRUNELL, OF LOS ANGELES, CALIFORNIA.

INTERNAL-COMBUSTION ENGINE.

Application filed November 20, 1922. Serial No. 602,179.

*To all whom it may concern:*

Be it known that I, EVERETT R. BURTNETT, a citizen of the United States, residing at Los Angeles, in the county of Los Angeles, State of California, have invented new and useful Improvements in Internal-Combustion Engines, of which the following is a specification.

My invention relates generally to internal combustion engines, and more particularly to a four cycle throttle controlled engine having a duo fuel induction system and of the type generally used for vehicular propulsion.

To obtain maximum engine efficiency from the liquid hydro-carbon or gasoline that is utilized as fuel in internal combustion engines, it is necessary to thoroughly vaporize the liquid fuel before it is taken into the combustion chambers.

The gasoline now generally produced and marketed is of a relatively heavy nature and, not all of the generally used carburetors are effective in producing the desired degree of vaporization.

The degree to which the liquid fuel is vaporized before it is taken into the engine cylinders, or the state of vaporization, is the factor that controls the power derived from a given quantity of fuel; in other words, the fuel economy in engine operation.

Heat applied to the inlet manifold of the engine assists in obtaining the desired state of vaporization and in decreasing condensation of a part of the vaporized fuel charge as it passes through said inlet manifold, but the application of heat to the fuel vaporizing system and inlet manifold produces vaporized fuel charge volume that is flowing to the cylinders, and also a reduction in molecular density and air value.

This latter action through the application of heat to assist in the process of complete vaporization for maximum economy of combustion, governs the initial charge weight, which results in the reduction of a maximum expansion pressure as obtained from an initial volume of greater charge weight.

The principal objects of my invention are to provide a double fuel vapor system and a duplex manifold system for supplying the desirable charge value, variable in molecular density and variable with the throttle range and power demand and to provide an internal combustion engine of maximum light load fuel economy operation and of maximum power output for full operation from a given piston displacement.

Further objects of my invention are to provide, in an internal combustion engine that operates by the four stroke cycle principle, means for admitting a constant, practically inert charge volume unrestricted by manifold throttle valve strangulation, and proportionate to the piston displacement, as a constant practically inert volume content for the engine cylinder, before the induction, as a supercharge, of preheated thoroughly vaporized gaseous mixture, and further to provide for the stratification of the inducted gaseous mixture.

The ignition of the compressed stratified charge and the increased expansive pressure due to the greater compression pressure resulting from the constant displacement of the inert volume, provides maximum fuel economy at light loads, and the operation of the engine being accomplished by the complete combustion of the admitted fuel.

Further objects of my invention are, to provide a duo fuel charge system that is available and operable when maximum power output is desired and to provide means for changing the inert volume to the cylinder, from an initial displacement volume, to a system of conventional gaseous fuel mixture inducted by the suction stroke of the piston and the induction of additional charge by pumping means as a supercharge.

In my improved engine this additional charge that is inducted under pressure, is the constant operation gaseous mixture supply medium and, it is heated while it is flowing to the cylinder, so that the mixture provided for combustion as a stratified charge to the constant practically inert volume during light load operation and throttle, will be of a maximum fuel economy mixture nature. Insamuch as this charge is the latter portion of the gaseous mixture charge inducted as a supercharge during full throttle operation and said charge is preheated and located immediately adjacent to the spark plug or other ignition means, its combustion will be instant and complete and the heat of the combustion and the resulting rise in pressure will affect that portion of the gaseous mixture first admitted under the full throttle, full load operation range and admitted to the cylinder without preheating, for charge volume density value, so as to produce a state of increased combustible vaporization.

This desirable result enables an engine to be operated with great fuel economy at light loads and with increased power while under full loads.

With the foregoing and other objects in view, my invention consists in certain novel features of construction and arrangement of parts that will be hereinafter more fully described and claimed and illustrated in the accompanying drawings in which:

Fig. 3 is an enlarged vertical section taken on the line 3—3 of Fig. 1.

Fig. 4 is an enlarged horizontal section taken on the line 4—4 of Fig. 1.

Fig. 5 is a diagrammatic view showing the arrangement of the valves and cylinders and also the ducts that lead to and from said valves and cylinders.

Figure 1:
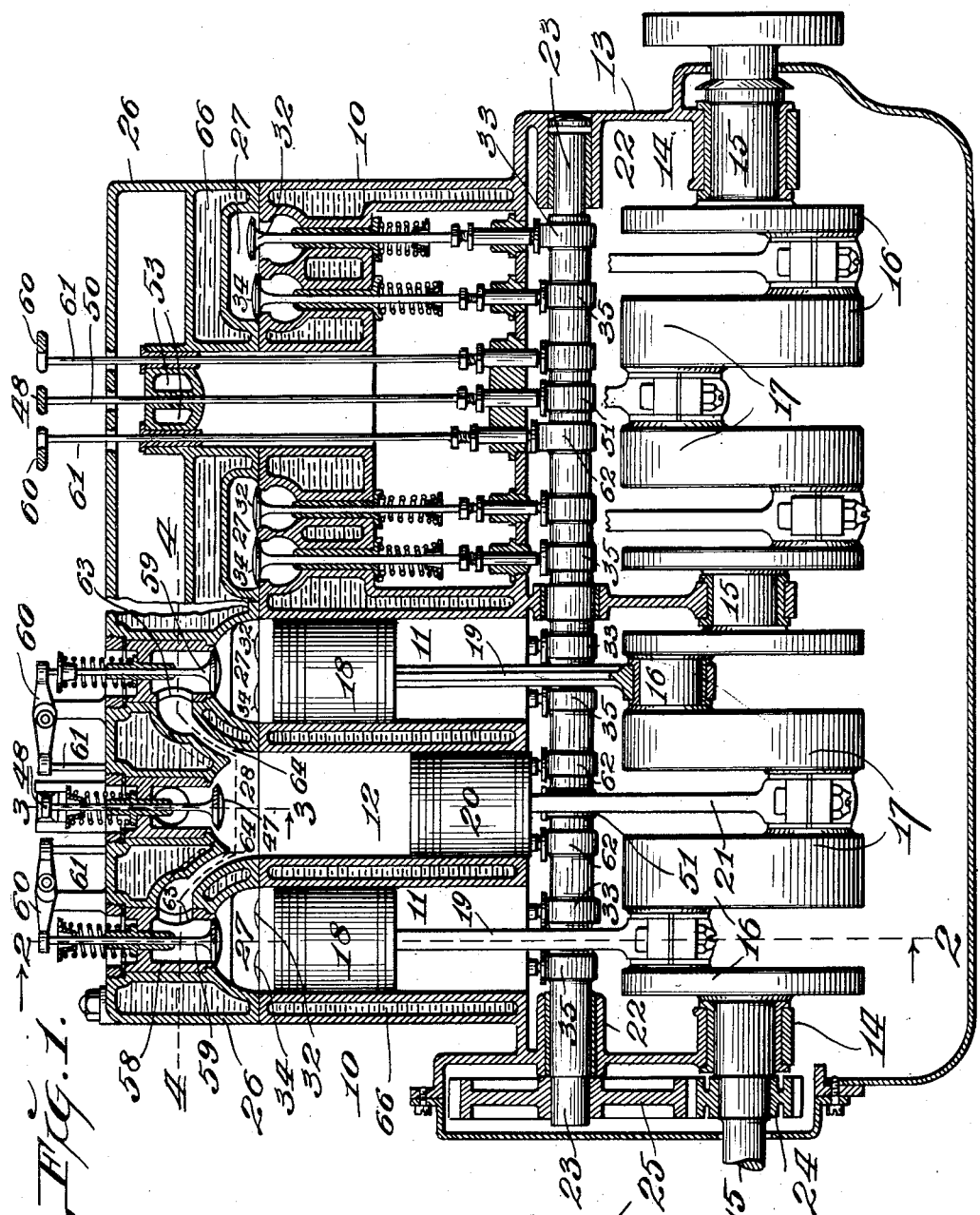
Fig. 1 is a vertical section taken lengthwise through an engine of my improved construction said view being taken in two different planes, the left hand portion being taken on the plane occupied by the axes of three of the cylinders and the right hand portion of said view being taken through the valvular structures that are associated with the engine cylinders.

Referring by numerals to the accompanying drawings, 10 designates a cylinder block, in which is formed a series of four combined combustion and expansion chambers 11, and formed between the members of each pair of these chambers is a gaseous fuel charge compression chamber such as 12.

All integral housing 13 depends from the block 10 and forms the upper portion of a crank case and journalled in suitable bearings 14, in the end walls of said housing, is a crank shaft 15.

This crank shaft is provided with cranks 16 that are disposed respectively beneath the chambers 11, and with cranks 17 that are disposed respectively beneath the chambers 12.

Arranged for reciprocatory movement within chambers 11 are power pistons 18 that are connected to the respective cranks 16 by connecting rods 19 and compressing pistons 20, that are arranged for operation within chambers 12, are connected to cranks 17 by connecting rods 21.

Journalled in suitable bearings 22 in the end walls of housing 13, is a cam shaft 23 that is driven at half engine speed by means of a relatively small pinion 24 on crank shaft 15 and which meshes with a larger pinion 25 on said cam shaft.

Secured on top of the cylinder block 10 is a head block 26 having formed in its underside, dome shaped recesses 27 that form extensions for the upper ends of the combustion chambers 18 and said recesses constituting ignition chambers.

Similar recesses 28 are formed in the underside of block 26 immediately above the compression chambers 12.

Formed in block 26 and extending laterally from each ignition chamber 27 is a valve chamber 29, and communicating with each chamber is the inner end of a normal or relatively cool gaseous fuel inlet duct 30 and the inner end of an exhaust duct 31.

Ducts 30 and 31 are formed in the upper side portion of block 10 directly behind the upper portion of each chamber 11.

The inner end of each inlet duct 30 is normally closed by an ordinary spring held poppet valve 32, that is elevated and unseated by a cam 33 on shaft 23.

The inner end of each exhaust duct 31 is normally closed by an ordinary spring held poppet valve 34 that is elevated and unseated by a cam 35, on shaft 23.

Arranged directly behind the upper portion of block 10 is a horizontally disposed duct 36, having branches 37 that lead to the respective inlet ducts 30 and connected to the intermediate portion of this duct 36 is an inert volume inlet duct 38 and a duct 39 for the admission of gaseous fuel of normal temperature.

Duct 38 is provided with a suitable throttle valve 40 that may be manually controlled.

Figure 2:
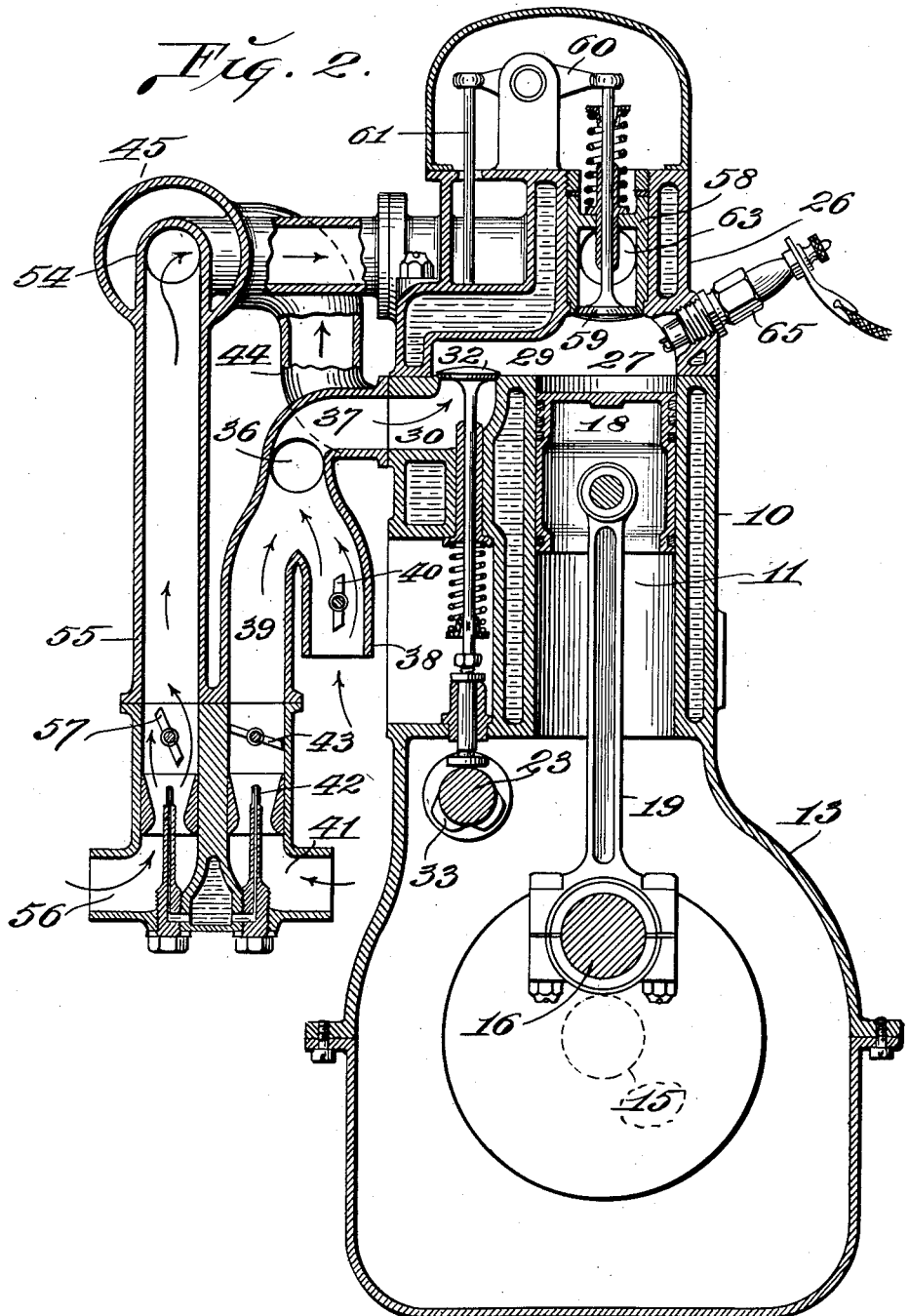
Fig. 2 is an enlarged vertical section taken on the line 2—2 of Fig. 1.

Duct 39 is connected to a suitable source of gaseous fuel supply, for instance, a carburetor, or as shown in Fig. 2, to a duct 41, having a liquid hydrocarbon jet nozzle 42 and a throttle valve 43 that may be manually controlled.

The construction including the parts 36, 37, 38, 39, 40, 41 and 42 provides an inlet manifold for inert gases atmospheric air, for gaseous fuel at normal temperatures or for a mixture of non-heated air and gaseous fuel.

Leading from the outer ends of the exhaust ducts 31, are ducts 44 that connect with a common exhaust manifold 45.

Arranged in block 26 directly above each chamber 28 is a cylindrical valve cage 46, having at its lower end a seat for an inwardly opening spring held valve 47.

Each of these valves 47 is adapted to be unseated by a rocker arm 48, that is fulcrumed on a bracket 49 on top of block 26 and said rocker arm being actuated by a push rod 50, the lower end of which bears on a cam 51 on shaft 23.

Each cage 46 is provided above its valve 47 with an inlet port 52 that is in direct communication with the inner end of a gaseous fuel duct 53 and the outer end of the latter being connected with the end portion of a fuel inlet manifold 54, that is enclosed by exhaust manifold 45. This arrangement provides means for very thoroughly pre-heating the gaseous fuel that passes through the inlet manifold into the compression chambers 12.

Connected to the central portion of manifold 54 is a gaseous fuel supply pipe 55 that leads from a suitable source of gaseous fuel supply, for instance, a carburetor, or as illustrated in Fig. 2, said pipe 55 may be provided with a liquid hydro-carbon nozzle 56, and a throttle 57, that may be manually controlled.

The construction including the parts 47, 52, 53, 54, 55, 56 and 57 provides an inlet manifold for admitting pre-heated gaseous fuel into the compression chambers 12.

Located in block 26 above each ignition chamber 27 is a cylindrical valve cage 58, the lower end of which is normally closed by an inwardly opening spring held valve 59.

Each valve is adapted to be opened, or forced from its seat by a rocker arm 60, the latter being actuated by a push rod 61, the lower end of which bears on a cam 62 on shaft 23.

Each cage 58 is provided above its valve with a transfer inlet port 63, that communicates directly with the outer end of a transfer duct 64, and the inner end of the latter, communicating directly with chamber 28, just below valve 47.

Seated in the front wall of block 26 directly in front of each ignition chamber 27 is a spark plug 65 and the inner ends of the electrodes thereof terminate within said ignition chamber.

The walls of block 10 and of head block 26 are provided with chambers 66 through which may be circulated a suitable fluid cooling medium such as water.

The operation of my improved engine is as follows:

It will be understood that my improved engine operates as a four stroke cycle and that the charges of gaseous fuel that are compressed in each chamber 12 are delivered alternately to the adjacent combustion chambers 11.

As piston 18 passes its high center after its compression stroke, a spark is produced between the terminals of the electrodes of the corresponding plug 65, thereby igniting the compressed charge of gaseous fuel within the ignition chamber 27 and the expansion following combustion, drives the piston downwardly on its power stroke and the resulting motion and power are transmitted through connecting rod 19 to crank shaft 15.

On the succeeding upward or exhaust stroke of the piston, the corresponding cam 35 unseats the corresponding exhaust valve 34, thereby permitting the products of combustion to pass from the combustion chamber through chamber 29 past open valve 34, and thence through exhaust ducts 31 and 44, to exhaust manifold 45 and which latter, it will be understood encloses inlet manifold 54.

On the succeeding downward or suction stroke of the piston, the corresponding cam 33 opens the corresponding inlet valve 32, to admit to combustion chamber 11, from duct or manifold 36, a charge of inert gases, unheated air, or gaseous fuel and which latter passes through ducts 37 and 30 past open valve 32 and thence through chamber 29 to said combustion chamber.

The inert charge volume or air is admitted to manifold 36 through inlet duct 38 and the volume flow thereof is controlled by throttle 40.

The gaseous fuel supply for manifold 36 includes jet nozzle 42, air inlet duct 41 and duct 39, which latter contains throttle 43 that may be actuated to control the volume flow of the gaseous fuel.

This initial charge for the combustion chamber may be very accurately regulated and controlled by proper manipulation of the throttle valves 40 and 43.

As the piston approaches its low center on its suction stroke inlet valve 32 closes and the corresponding cam 62, through rod 61 and rocker arm 60 unseats corresponding fuel inlet valve 59, thereby admitting to the upper end of the combustion chamber 11, a super-charge of preheated gaseous fuel and which latter was compressed in the upper portion of chamber 12 on the preceding upward stroke of compression piston 20. This compressed super-charge passes through the corresponding transfer duct 64, inlet port 63 and past open inlet valve 59.

Thus at the end of the suction stroke of piston 18, the lower portion of chamber 11 is filled with an inert charge volume air or unheated gaseous fuel and the upper portion of said chamber is filled with a super-charge of compressed pre-heated gaseous fuel.

On the succeeding upward or compression stroke of the piston the entire charge within the combustion chamber will be compressed in stratified formation within the ignition chamber 27 and with the stratum of preheated gaseous fuel in the upper portion of said chamber where it entirely surrounds the inner ends of the electrodes of the spark plug.

As the piston passes high center, the compressed charge is ignited and the piston is driven downwardly on its power stroke as hereinbefore described.

At the beginning of the downward travel of compression piston 20, the corresponding cam 51, through rod 50 and rocker arm 48 inseats valve 47 and the partial vacuum produced within the compression chamber 12 as the piston travels downward therein, will cause a charge of gaseous fuel to be drawn into said chamber, and which gaseous fuel passes through duct 55, manifold 54, branch duct 53, and thence through inlet port 52, and past open valve 47.

This gaseous fuel is formed by the mixture of air entering the open lower end of duct 55 with liquid hydro-carbon that discharges from nozzle 58 and as manifold 54 is enclosed by exhaust manifold 45, the gaseous fuel in passing through the inlet manifold will be heated and therefore become highly vaporized before it enters the compression chamber.

Obviously, the heat produced by compression will further vaporize this fuel charge, so that when taken into the combustion chamber and compressed and ignited, it will produce maximum power efficiency.

Thus it will be seen that I have produced a relatively simple and practical engine, having a readily controlled duo fuel induction system and which engine may be very economically operated under all load conditions and requirements.

It will be understood that various changes in the size, form and construction of the various parts of my improved engine may be made and substituted for those herein shown and described without departing from the spirit of my invention, the scope of which is set forth in the appended claims.

I claim as my invention:—

1. An internal combustion engine having two combustion cylinders and a charge pumping cylinder that form a cycle unit, a valved inlet for each combustion cylinder, for the admission of a charge volume from a manifold common to all combustion cylinders, a valved transfer duct from the pumping cylinder to each combustion cylinder, a valved exhaust port for each combustion cylinder, a valved inlet port for the pumping cylinder for the admission of a charge volume from an inlet manifold common to all pumping cylinders, and means for actuating all of the valves of said ports, in proper time relation to each other.

2. An internal combustion engine having a dual inlet valve system and a dual inlet manifold system, one manifold supplying charge volumes directly to the combustion chamber of the engine during the suction stroke of the piston within said cylinder, the second manifold supplying charge volumes to a pumping cylinder to be precompressed and inducted at the end of the direct charge volume period of admission to the combustion cylinder as a super-charged volume to said combustion cylinder.

In testimony whereof I have signed my name to this specification.

EVERETT R. BURTNETT.